United States Patent [19]

Beard

[11] 4,389,312
[45] Jun. 21, 1983

[54] VARIABLE VENTURI SEWERAGE AERATOR

[76] Inventor: Harold Beard, P.O. Box 3838, Baton Rouge, La. 70821

[21] Appl. No.: 308,279

[22] Filed: Oct. 5, 1981

[51] Int. Cl.³ ............................ C02F 1/74; B01F 5/04
[52] U.S. Cl. .................................. 210/198.1; 210/194; 261/77; 261/DIG. 75
[58] Field of Search ..................... 210/194, 195.1, 197, 210/198.1; 261/36 R, 76, 119 R, DIG. 75, 77

[56] References Cited

U.S. PATENT DOCUMENTS

| | | | |
|---|---|---|---|
| 585,404 | 6/1897 | Porak | 261/36 R |
| 801,641 | 10/1905 | Boetcher | 261/76 X |
| 1,140,548 | 5/1915 | Vogelsang | 261/76 |
| 1,808,956 | 6/1931 | Ketterer | 261/36 R X |
| 2,020,850 | 11/1935 | Myhren et al. | 261/DIG. 75 |
| 2,060,557 | 11/1936 | Davis | 261/76 X |
| 2,128,311 | 8/1938 | Mertes | 261/76 X |
| 2,481,959 | 9/1949 | Wahlin | 261/36 R X |
| 2,658,735 | 11/1953 | de Ybarrondo | 261/77 |
| 3,058,726 | 10/1962 | Goettl | 261/77 X |
| 3,224,170 | 12/1965 | Iwanaga et al. | 261/77 X |
| 3,676,075 | 7/1972 | Ploger et al. | 261/36 R X |
| 3,833,719 | 9/1974 | Kuerten et al. | 261/76 X |
| 4,226,719 | 10/1980 | Woltman | 261/77 X |
| 4,292,259 | 9/1981 | Roth et al. | 261/76 X |

FOREIGN PATENT DOCUMENTS

| | | | |
|---|---|---|---|
| 2238525 | 2/1975 | France | 261/36 R |
| 16170 | 9/1906 | Norway | 261/36 R |
| 308254 | 6/1930 | United Kingdom | 261/36 R |

Primary Examiner—Robert H. Spitzer
Attorney, Agent, or Firm—Roy, Kiesel, Patterson & McKay

[57] ABSTRACT

A sewerage aerator is illustrated having an air feed diffuser with air opening adjustably positioned approximate venturi throat located above the liquid sewerage tank level and having means to introduce the liquid sewerage to the upper venturi chamber and cause it to flow past the air openings.

1 Claim, 3 Drawing Figures

VARIABLE VENTURI SEWERAGE AERATOR

BACKGROUND OF THE INVENTION

1. Field of the Invention

This invention relates generally to aerators, and more particularly to a variable venturi sewerage aerator.

2. Prior Art

The use of varied designed aerators in a multitude of industries is well known. However, sewerage treatment presents many special problems that can not be as effectively or as efficiently handled by present art techniques such as those disclosed in the following illustrated U.S. patents:

| U.S. PAT. NO. | INVENTOR | ISSUED | TITLE |
| --- | --- | --- | --- |
| Re 22,654 1,774,793 | Egan | 4/9/27 | "SEWER CONSTRUCTION" |
| 2,374,772 | Nordell | 5/1/45 | "APPARATUS FOR AERATING SEWAGE" |
| 3,517,812 | D. Bucchioni | 6/30/70 | "PROCESS AND APPARATUS FOR REMOVING FLOATING WASTE FROM WATER SURFACES" |
| 3,701,429 | Schell | 10/31/72 | "SKIMMER FOR REMOVING FLOATING MATTER FROM A BODY OF LIQUID" |
| 3,744,257 | Spanner | 7/10/73 | "WATER-SURFACE CLEANSING SHIP" |
| 4,038,185 | Kline | 7/26/77 | "SCUM CONTROL SYSTEM FOR PERIPHERAL FEED CHANNEL OF SEDIMENTATION TANK" |
| 4,087,361 | Block, et al | 5/2/78 | "ACTIVATED SLUDGE SYSTEM WITH STAGGERED PARTITION BASIN" |
| 4,116,835 | Bertelson | 9/26/78 | "POLLUTION CONTROL SYSTEM" |
| 4,119,541 | Makaya | 10/10/78 | "ARRANGEMENT FOR DISPOSING OF FLUID FLOATING MATTER" |
| 4,219,424 | Tamura et al | 8/26/80 | "APPARATUS FOR ENRICHING OXYGEN CONTAINED IN WATER" |

Some of the main difficulties include equipment clogging due to the nature of the liquid sewerage, difficulty in repairing clogged equipment due to its submerged location, restrictions on the amount of air supplied to sewerage per pump horsepower needed, insufficient sewerage exposure to air due to large air bubble size, too limited exposure time between the sewerage and the air, inability to rapidly vary air flow rates to compensate for changes in sewerage composition, and inability of equipment to handle a variety of wastewater treatment applications.

The best available equipment includes design such as that sold by Hondaille Industries, Inc. as shown in their advertising brochures PAATB979-10M. However, such equipment still retains many of the above mentioned problems.

SUMMARY OF THE INVENTION

Therefore, it is an object of this invention to provide an improved aerator for use in treating liquid sewerage.

Another object of this invention is to provide a sewerage aerator which reduces or eliminates the aforementioned equipment difficulties.

These and other advantages and objects of this invention shall become apparent from the ensuing descriptions of the invention.

Accordingly, an aerator to be used in liquid sewerage treatment is disclosed comprising a venturi tubing positionable above the level of the liquid sewerage being treated and having a sewerage inlet port opening into the tube above the restricted venturi opening, an air feed diffuser inserted in the venturi and having air outlet ports positioned approximate the restricted venturi opening, and means for forcing the liquid sewerage through the inlet port opening.

BRIEF DESCRIPTIONS OF THE DRAWINGS

PREFERRED EMBODIMENTS OF THE INVENTION

Although the preferred embodiments of this invention are disclosed for use in liquid sewerage treatment it is to be understood that the aerator of this invention could be used in other liquid treatment applications.

Figure 1:
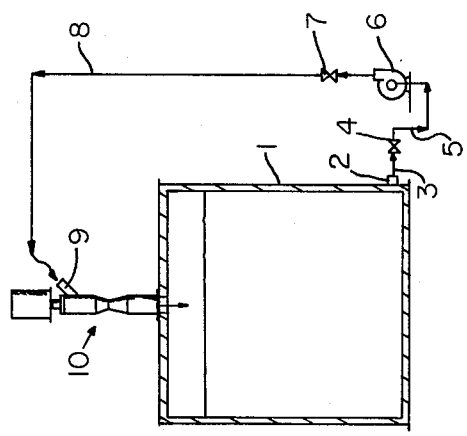
FIG. 1 is a schematic diagram of the liquid sewerage treatment through the aerator of this invention.

Turning now to FIG. 1, a holding tank 1 containing liquid sewerage up to level "L" is depicted having outlet port 2 to allow the liquid sewerage to flow through pipe 3, valve 4 and pipe 5 to pump 6. Pump 6 then forces the liquid sewerage through valve 7 and up pipe 8 to liquid sewerage inlet port 9 of venturi 10.

Figure 2:
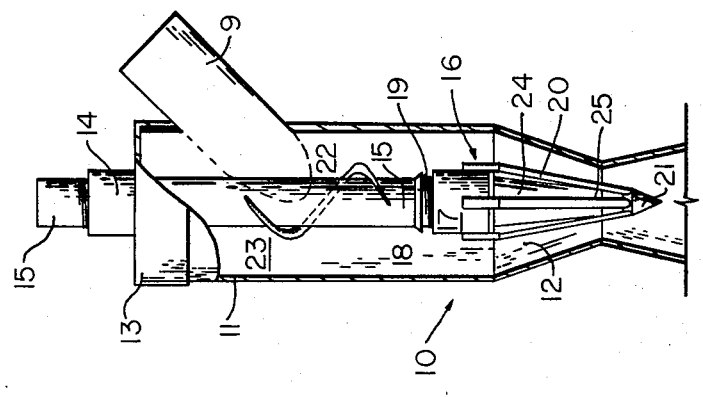
FIG. 2 is a cutaway three-dimensional view of a preferred embodiment of the aerator of this invention.

Referring now to FIG. 2, venturi 10 comprises hollow venturi casing 11 having restricted flow chamber 12. Cap 13 seals the top of casing 11 and in provided with a threaded hollow stud 14 for receiving air feed pipe 15 having diffuser assembly 16 attached at on end of pipe 15.

Pipe 15 is also preferably threaded so that adjustments in the position of diffuser assembly 16 can be made.

Diffuser assembly 16 comprises threaded tube section 17 which is screwed about threads 18 of pipe end 19 to fix assembly 16 onto pipe 15. Extending downward and inward toward one another from the tube section 17 are vanes 20 which attach at their opposite end to air feed agitator 21.

In another preferred embodiment metallic blades 22 are helically attached to pipe 15 and are positioned in venturi cavity 23 to assist in agitation of the liquid sewerage. More preferably blades 22 are positioned directly in the path of the liquid sewerage as it enters cavity 23 from inlet port 9.

In operation liquid sewerage is pumped through inlet port 9 into cavity 23 where it strikes blades 22 before flowing through chamber 12, past diffuser assembly 16 and finally back to tank 1. The flow of the liquid sewerage through chamber 12 creates a pressure drop between the inside of pipe 15 and chamber 12 resulting in air being drawn down tube 15 and out tube section 17 where it along with the liquid sewerage strike vanes 20 and agitator 21 resulting in good mixing of the two.

Then the air reacts with the liquid sewage as it is returned to tank 1 when it flows out of venturi 10.

By placing diffuser tube tip 24 within vanes 20 so that its lower opening 25 is at the most restricted area of chamber 12 maximum air mixing can be achieved. This allows for a reduction in pump size for a given venturi size and shape. Then once pump 6 is selected and installed the amount of air liquid sewerage mixing can be varied by simply screwing pipe 15 in or out.

Furthermore, as is seen, this system does not require use of a submerible pump and since venturi 10 is positioned above the liquid sewerage level 10, top 13 can be quickly removed to allow cleaning of diffuser assembly 16.

Figure 3:
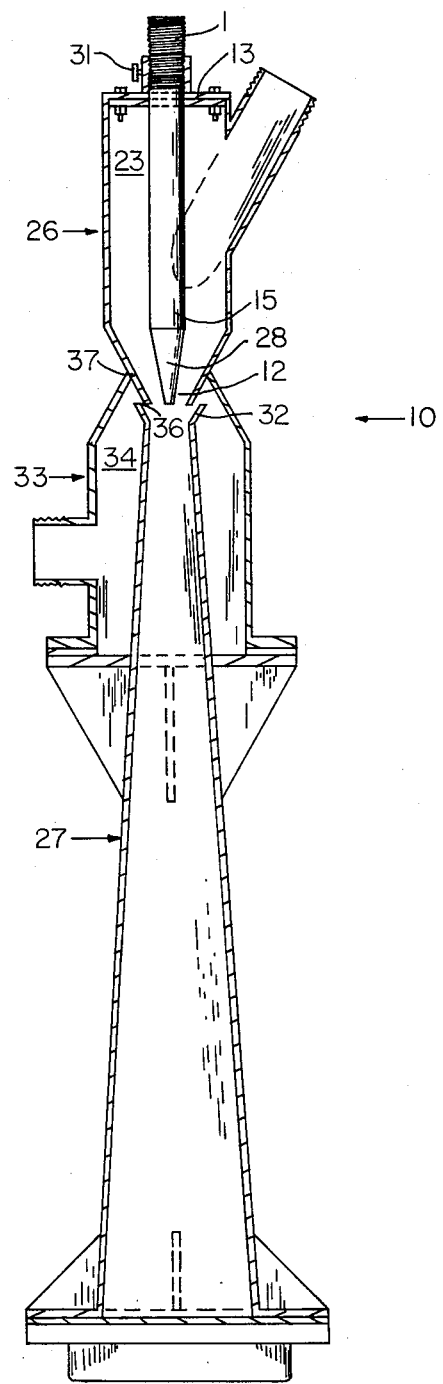
FIG. 3 is a cutaway three-dimensional view of an alternate preferred embodiment of the aerator of this invention utilizing a second air opening.

In a alternate preferred embodiment as shown in FIG. 3 venturi 10 comprises a venturi inlet section 26 and a venturi outlet section 27 wherein air feed pipe 15 is positioned inside venturi cavity 23 with its nozzle end 28 located in restricted flow chamber 12; pipe 15 is provided with threads 30 so that pipe 15 can be vertically adjusted. In a preferred embodiment set screw 31 is provided to prevent pipe 15 from moving once the desired position is reached.

Positioned about venturi outlet section 27 which has a flared end 32 positioned directly below nozzle end 28 is second air supply casing 33 which is attached to both venturi inlet and outlet sections 26 and 27, respectively, to form a sealed chamber 34. In this preferred embodiment additional air enters casing inlet port 35 and flows through ring opening 36 formed between the separated flare end 32 and venturi casing lower end 37. In this manner additional air mixing can be achieved without use of diffuser assembly 16, although diffuser assembly 16 could still be employed.

There are, of course other alternate embodiments not specifically described but which are intended to be included within the scope of this invention as defined by the following claims.

What I claim is:

1. An aerator for use in oxidizing a liquid stream comprising:
   (a) a venturi positioned above said liquid stream having an upper cavity and lower restricted opening chamber, said venturi having a stream inlet port opening into said cavity;
   (b) a hollow pipe attachable to said venturi and extending into said cavity; and,
   (c) a diffuser assembly attached to the lower end of said hollow pipe and comprising a hollow tube section having a tube opening, said diffuser assembly comprising:
      i. said hollow tube section being detachable from said hollow pipe;
      ii. a conical-shaped hollow pipe attached by the base of said conical-shaped hollow pipe to said hollow tube section;
      iii. vanes attached at one end to said hollow tube section and extending downward and inward below said conical-shaped hollow pipe wherein they are attached at their opposite end to an agitator.

* * * * *